United States Patent
Falcetano et al.

(10) Patent No.: US 11,755,647 B2
(45) Date of Patent: Sep. 12, 2023

(54) XML PRODUCTION THROUGH DATABASE MINING AND BLOCKCHAIN

(71) Applicant: International Business Machines Corporation, Armonk, NY (US)

(72) Inventors: Michael J Falcetano, Newburgh, NY (US); Keith Joseph Miller, Pawling, NY (US); John Bouzakis, Wappingers Falls, NY (US); Michael Kelly, Port Ewen, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 17/110,467

(22) Filed: Dec. 3, 2020

(65) Prior Publication Data
US 2022/0179905 A1 Jun. 9, 2022

(51) Int. Cl.
*G06F 40/00* (2020.01)
*G06F 16/84* (2019.01)
*G06F 40/143* (2020.01)
*G06F 8/658* (2018.01)

(52) U.S. Cl.
CPC .............. *G06F 16/84* (2019.01); *G06F 8/658* (2018.02); *G06F 40/143* (2020.01)

(58) Field of Classification Search
None
See application file for complete search history.

(56) References Cited

U.S. PATENT DOCUMENTS

| | | | |
|---|---|---|---|
| 6,901,403 B1 | 5/2005 | Bata | |
| 7,685,150 B2 | 3/2010 | Manikutty | |
| 7,805,474 B2 | 9/2010 | Warshavsky | |
| 8,417,714 B2 | 4/2013 | Idicula | |
| 8,468,446 B2 | 6/2013 | Molenaar | |
| 10,291,627 B2 | 5/2019 | Gleichauf | |
| 10,338,913 B2 | 7/2019 | Franchitti | |
| 11,475,024 B2 * | 10/2022 | Sriharsha | G06F 16/168 |
| 2014/0236615 A1 * | 8/2014 | Ragusky | G16H 40/20 |
| | | | 705/28 |

FOREIGN PATENT DOCUMENTS

CN 101765842 B * 10/2012 ....... G06F 17/30935

OTHER PUBLICATIONS

Amin, Moustafa, "Blockchain-VXLAN", An IP.com Prior Art Database Technical Disclosure, IP.com No. IPCOM000250654D, Aug. 16, 2017, 8 Pages.

(Continued)

*Primary Examiner* — Tuankhanh D Phan
(74) *Attorney, Agent, or Firm* — Stephanie L. Carusillo

(57) ABSTRACT

In an approach for dynamically generating correctly formatted Extensible Markup Language (XML) based off of a subset of data from a database, a processor receives an input pointing to a subset of data. A processor collects the subset of data from existing sources. A processor modifies the subset of data using wildcarding to generate a modified subset of data. A processor generates a set of XML files from the modified subset of data. A processor creates an immutable record of the subset of data, the modified subset of data, and the set of XML files. A processor outputs the set of XML files.

14 Claims, 3 Drawing Sheets

(56) References Cited

OTHER PUBLICATIONS

Authors et al. Disclosed Anonymously, "Ledger (BlockChain) Based Data Access and Distribution Control", An IP.com Prior Art Database Technical Disclosure, IP.com No. IPCOM000259876D, Sep. 26, 2019, 10 Pages.

Authors et al. Disclosed Anonymously, "Predictive Cryptocurrency Mining and Staking", An IP.com Prior Art Database Technical Disclosure, IP.com No. IPCOM000252017D, Dec. 13, 2017, 34 Pages.

Nirsch et al., "Implementing a blockchain from scratch: why, how, and what we learned", EURASIP Journal on Information Security, 2019, 14 Pages.

Lemieux et al., "Blockchain Technology & Recordkeeping", ARMA International Educational Foundation, Canada, May 30, 2019, 139 Pages.

\* cited by examiner

XML PRODUCTION THROUGH DATABASE MINING AND BLOCKCHAIN

BACKGROUND OF THE INVENTION

The present invention relates generally to the field of data processing, and more particularly to dynamically generating correctly formatted XML based off of a subset of data from a database.

Extensible Markup Language (XML) is a markup language that defines a set of rules for encoding documents in a format that is both human-readable and machine-readable. The design goals of XML emphasize simplicity, generality, and usability across the Internet. It is a textual data format with strong support via Unicode for different human languages. Although the design of XML focuses on documents, the language is widely used for the representation of arbitrary data structures, such as those used in web services. Several schema systems exist to aid in the definition of XML-based languages, while programmers have developed many application programming interfaces (APIs) to aid the processing of XML data.

SUMMARY

Aspects of an embodiment of the present invention disclose a method, computer program product, and computer system for dynamically generating correctly formatted XML based off of a subset of data from a database. A processor receives an input pointing to a subset of data. A processor collects the subset of data from existing sources. A processor modifies the subset of data using wildcarding to generate a modified subset of data. A processor generates a set of Extensible Markup Language (XML) files from the modified subset of data. A processor creates an immutable record of the subset of data, the modified subset of data, and the set of XML files. A processor outputs the set of XML files.

In some aspects of an embodiment of the present invention, the input includes a release and a driver name that point to the subset of data.

In some aspects of an embodiment of the present invention, a processor modifies the subset of data by identifying a list of shipped parts from the subset of data; grouping shipped parts on the list of shipped parts by Distribution Library and part type; and creating a single line entry for a grouping of shipped parts by using a wildcard character.

In some aspects of an embodiment of the present invention, responsive to generating the modified subset of data, a processor enables a user through a user interface to review the modified subset of data.

In some aspects of an embodiment of the present invention, the set of XML files include a build XML file, a function XML file, a service XML file, and a package XML file.

In some aspects of an embodiment of the present invention, a processor generates a dataset of supporting information for each XML file of the set of XML files.

In some aspects of an embodiment of the present invention, a processor enables a user through a user interface to validate the set of XML files based on the immutable record.

DETAILED DESCRIPTION

Figure 1:
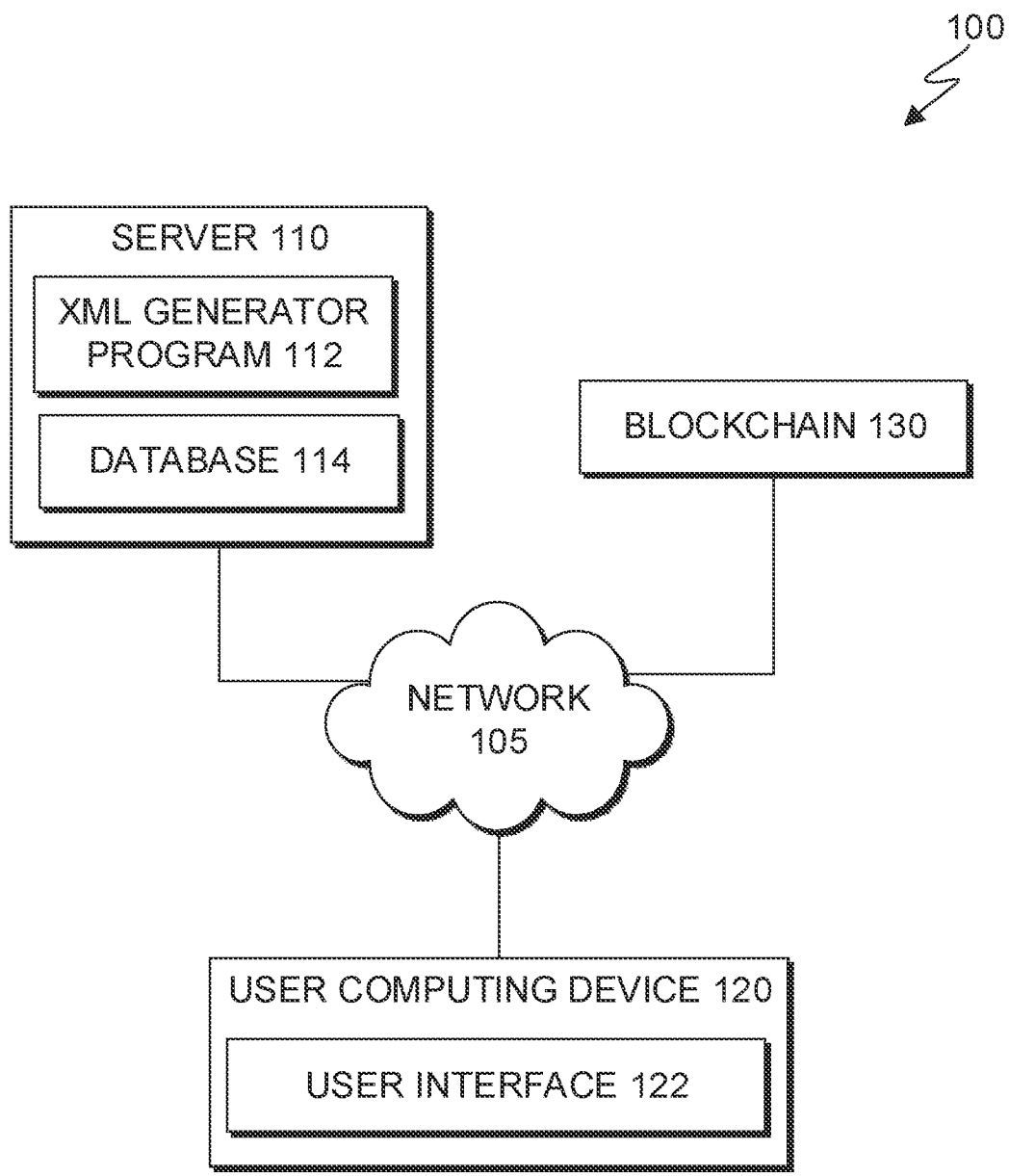
FIG. 1 is a functional block diagram illustrating a distributed data processing environment, in accordance with an embodiment of the present invention.

Embodiments of the present invention recognize that working with complex XML across a variety of use cases can become tedious for a user trying to generate the XML by hand to fit their needs. This especially holds true in the case where the user is trying to create the XML based off of previously indexed data within an enumerated database. The syntax of XML is very strict, i.e., missing end tags, quotes, brackets, etc. are not tolerated well. While strict, XML is also very flexible and allows for many different variations to accomplish the same task. The format of the XML files and the variables used within the XML files are left to the user producing them to choose. This hand generation of complex XML is undoubtedly error prone and the end product could look very different to what other users produce that are trying to derive similar XML from the same subset of data. Additionally, there is currently no method of verifying that what a user produces contains everything that is needed for the intended purpose that is going to consume the XML.

Thus, there is a need for a method of dynamically generating correctly formatted XML based off a subset of data from a database that could be leveraged to facilitate organizational processes by creating XML at a greater cadence derived from legacy data. There is also a need for a method to verify that the XML came from a "source of truth" that would show that the XML was created with the correct input data.

Embodiments of the present invention provide a system and method for dynamically generating correctly formatted XML based off of a subset of data from an enumerated database using an XML generator program. A preferred embodiment of the present invention is implemented in a z/OS® system for generating XML files for packaging operations of z/OS® software products that are being migrated. Within the preferred embodiment, legacy information is read out of specific baseline "release" levels that have multiple "drivers" within the release. These records represent the metadata processed to create the resulting XML output. The records represent a way to subset the data given to the XML generator program.

In an embodiment of the present invention, in order to test and distribute an z/OS® software product, the product must be packaged. The XML generator program provided herein will generate four XML files for each element being migrated. The four XML files are build.xml, function.xml, service.xml, and package.xml. These XML files are interconnected via common variables and are used in various combinations to perform all the varied packaging operations. Creation of the XML files requires varied information including packaging details of all shipped parts, prerequisites, conditional SYSMOD requisites (IFREQ), deletes, superseding SYSMOD (sups), component information, version information, etc.

Embodiments of the present invention mine the data needed to generate XML from existing sources, i.e., legacy information that already exists for each release to be migrated. The mined data is optimized by reformatting the data to be in a format conducive to combining like formats and using wildcarding to reduce the size of the XML files. Embodiments of the present invention extract the data, manipulate the data into a usable format, perform calculations and computations, and optimize the data to reducing the size of the XML files as much as possible to improve performance. Embodiments of the present invention generate the XML files using programmatic invocation, either through a foreground graphical user interface (GUI) or through background invocation via batch, to ensure correct syntax, consistent formatting, and a common structure. Embodiment of the present invention enable generation of XML files in seconds as opposed to the many hours or days it would take to generate by hand. Additionally, embodiments of the present invention enable generation of XML files without in-depth knowledge of the elements.

Embodiments of the present invention further store any information derived from the process of generating the XML files inside of a blockchain to aid in the validation of the objects produced if a user wants to check if the XML files they want to use are a valid derivative of the aforementioned XML generator program. Embodiments of the present invention employ blockchain to record the data mining steps to provide an immutable accounting of the derivation of the XML files generated. Validation can be performed using the derived XML files to check to see if the information matches what already exists within the blockchain from which its input data was derived from, i.e., the "source of truth", the original enumerated database. By utilizing blockchain, embodiments of the present invention provide confidence to a user in the produced implementation by identifying the source, builder, date, version, etc. of each chain in the block.

In an example use case, Bob is on a team within his organization that is working on a planned migration of z/OS® element packaging operations to new tooling that requires the creation of multiple XML files per element that dictate how elements are packaged. These XML files are very complex and can be extremely large. Depending on the size of the release being migrated, some of the XML files can be many thousands of lines. The data necessary to do the migration could be massive, extensive, and difficult to obtain. The manual effort required to create the XML files and the interconnections within them is time prohibitive.

Using embodiments of the present invention, Bob can quickly convert legacy data from his database of choice to the appropriate XML that he needs for the new packaging process. A process that would have taken hours could be done in an efficient manner within seconds using embodiments of the present invention. Bob runs the program and the appropriate data is given to him within seconds. The set of XML files generated at this time is loaded as transaction data into a block in an XML generator program blockchain.

Continuing the use case, later on, Mary finds some XML that looks like it was produced by the program but is not sure, and so she wants to know if the XML came from the program. Given that the XML program blockchain has all of the information ever run through the program, Mary can check to see if the data that comprises the XML exists within the blockchain so that she can know with certainty that the XML she found is valid.

Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and user computing device 120, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, user computing device 120, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with user computing device 120 and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes XML generator program 112 and database 114. Server 110 may include internal and external hardware components, as depicted and described in further detail with respect to FIG. 3.

XML generator program 112 operates to dynamically generate correctly formatted XML based off of a subset of data from a database and store the generated XML in a blockchain for later validity. XML generator program 112 generates XML files from data mined from legacy information of a release to be migrated, in which the release and driver information is input by a user. In the depicted embodiment, XML generator program 112 is a standalone program. In another embodiment XML generator program 112 may be integrated into another software product. In an embodiment, XML generator program 112 can be run through a GUI or can be invoked from a batch program via job control language (JCL) in the background with inputs filled in ahead of time. In an embodiment, XML generator program 112 is initiated for each code version received from a user, i.e., a point in time of how data is represented. In some embodiments, XML generator program 112 is initiated for each release and driver name received from a user, so XML generator program 112 knows which subset of data to collect. A release contains multiple drivers. In general software terms, a release is an established baseline of code from the beginning of what it was tracked. "Drivers" are essentially just software patches within the release that are used for tracking the changes made at different points in time through the duration of the release. XML generator program 112 is depicted and described in further detail with respect to FIG. 2.

Database 114 operates as a repository for data received, used, and/or output by XML generator program 112. Data received, used, and/or generated may include, but is not limited to, data collected and/or generated by XML generator program 112; XML files generated; and any other data received, used, and/or output by XML generator program 112. Database 114 can be implemented with any type of storage device capable of storing data and configuration files that can be accessed and utilized by server 110, such as a hard disk drive, a database server, or a flash memory. In an embodiment, database 114 is accessed by XML generator program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that XML generator program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. XML generator program 112 enables the authorized and secure processing of personal data.

XML generator program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. XML generator program 112 provides information regarding personal and/or confidential company data and the nature (e.g., type, scope, purpose, duration, etc.) of the processing. XML generator program 112 provides the user with copies of stored personal and/or confidential company data. XML generator program 112 allows the correction or completion of incorrect or incomplete personal and/or confidential company data. XML generator program 112 allows for the immediate deletion of personal and/or confidential company data.

Blockchain 130 is an immutable record for data collected and/or generated by XML generator program 112 that is stored in a blockchain type database. In an embodiment, blockchain 130 stores resulting output of what is stored in database 114 to provide an immutable accounting of the derivation steps used by XML generator program 112 to derive a set of XML files. Each step performed on input data received by XML generator program 112 is stored in a separate block in blockchain 130. A user can use blockchain 130 to validate the derived XML files to check to see if the information matches what already exists within the blockchain from which its input data was derived from, the "source of truth", i.e., the original enumerated database.

User computing device 120 operates as a computing device associated with a user allowing the user to interface with XML generator program 112 through a user interface, e.g., user interface 122. In an embodiment, user computing device 120 may be a laptop computer, a tablet computer, a smart phone, a smart watch, a smart speaker, smart glasses, wearable computer, or any programmable electronic device capable of communicating with various components and devices within distributed data processing environment 100, via network 105. In general, user computing device 120 represents one or more programmable electronic devices or combination of programmable electronic devices capable of executing machine readable program instructions and communicating with other computing devices (not shown) within distributed data processing environment 100 via a network, such as network 105. User computing device 120 may include internal and external hardware components, as depicted and described in further detail with respect to FIG. 3.

User interface 122 provides an interface between XML generator program 112 on server 110 and a user of user computing device 120. In one embodiment, user interfaces 122 and 132 are mobile application software. Mobile application software, or an "app," is a computer program designed to run on smart phones, tablet computers and other mobile devices. In one embodiment, user interface 122 may be a GUI or a web user interface (WUI) and can display text, documents, web browser windows, user options, application interfaces, and instructions for operation, and include the information (such as graphic, text, and sound) that a program presents to a user and the control sequences the user employs to control the program. User interface 122 enables a user of user computing device 120 to input information to initiate XML generator program 112 and/or view XML files generated by XML generator program 112.

Figure 2:
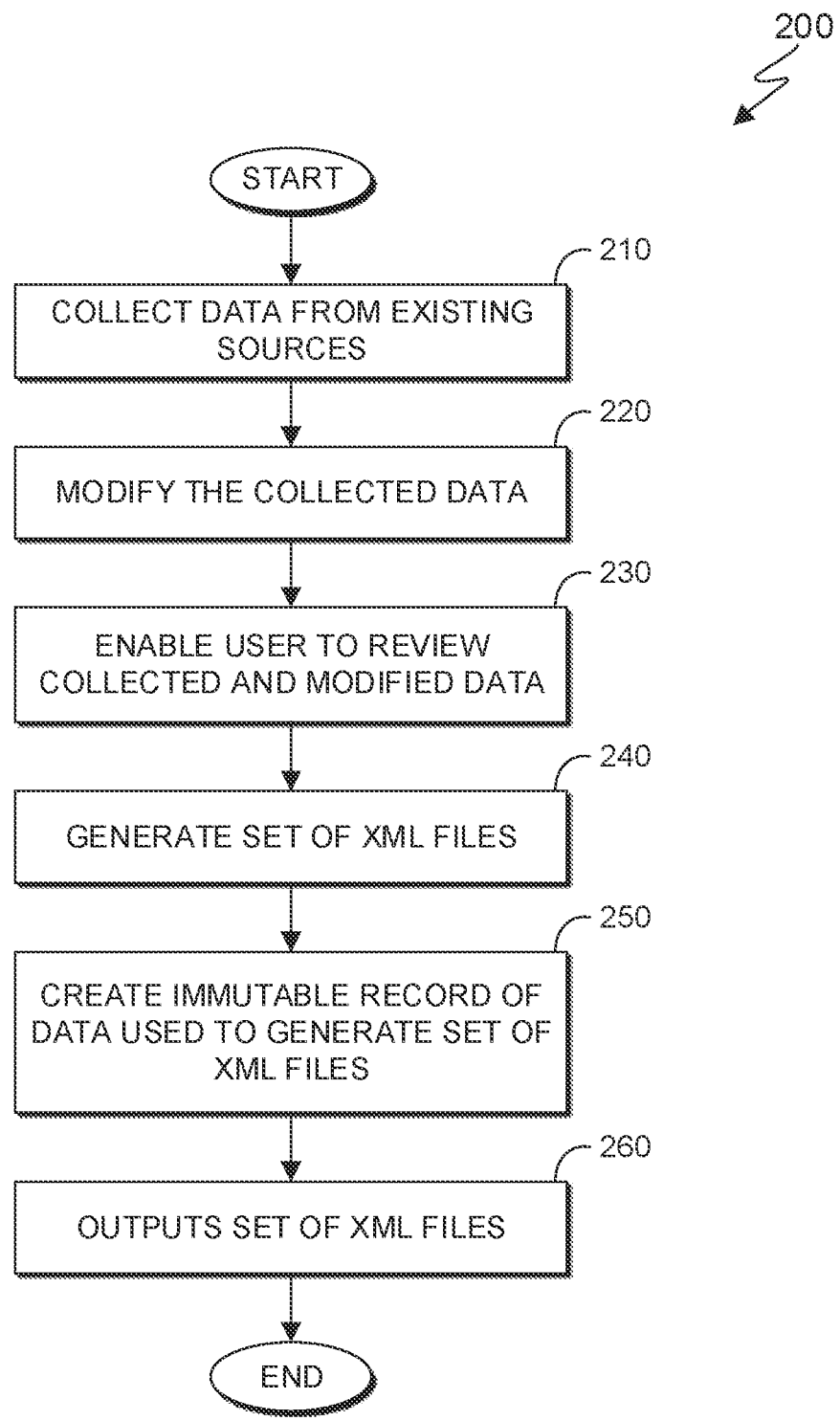
FIG. 2 is a flowchart depicting operational steps of an XML generator program, for dynamically generating correctly formatted XML based off of a subset of data from a database, in accordance with an embodiment of the present invention.

FIG. 2 is a flowchart 200 depicting operational steps of XML generator program 112, for dynamically generating correctly formatted XML based off of a subset of data from a database and storing the generated XML in a blockchain for later validity, in accordance with an embodiment of the present invention. It should be appreciated that the process depicted in FIG. 2 illustrates one possible iteration of XML generator program 112, which may be initiated and repeated for each release and driver name received by XML generator program 112 as input by a user through a user interface of a user computing device, e.g., user interface 122 of user computing device 120.

In step 210, XML generator program 112 collects data from existing sources. In an embodiment, XML generator program 112 collects data needed from multiple existing sources for a given OS element. In an embodiment, XML generator program 112 collects data needed from defined existing sources based on the particular release and driver input by the user. For example, in a z/OS® system, the data needed includes an entire SMPMCS file, ORDERs Partitioned Data Set (PDS), name and allocation parameters of each Distribution Library (i.e., an MVS PDS containing a subset of parts), component information for all shipped parts, and packaging metadata for all shipped parts as extracted from database stored metadata.

In step 220, XML generator program 112 modifies the collected data. In an embodiment, XML generator program 112 may handle collected data in varying formats, as each OS element is different, and may supply defaults for any missing information. XML generator program 112 needs to generate packaging information for each part being shipped, which can be thousands of parts. It is important to streamline the size of the XML files as much as possible to reduce the time required to run the packaging operation, particularly, the size of the function.xml file, which contains the directives to package every shipped part in the release. In an embodiment, XML generator program 112 manipulates and optimizes the collected data to reduce the size of the XML files as much as possible by detecting opportunities (i.e., finding commonalities in the data) to use wildcarding for part packaging information. Wildcarding involves using a wildcard character as a kind of placeholder represented by a single character, e.g., an asterisk (*), which can be interpreted as a number of literal characters or an empty string. It is often used in file searches to avoid typing the full name. Wildcarding can be used for inclusion or exclusion of data, which, in embodiments of the present invention, helps to drastically reduce the size of a generated XML.

In an embodiment, based on a shipped parts list from the collected data, XML generator program 112 groups all shipped parts by Distribution Library and Part Type. XML generator program 112 pre-scans each part's metadata to detect cases where the assigned CSECT name matches the distribution name of the part. In this case, XML generator program 112 substitutes a wildcard ("*") for the CSECT name, which can greatly reduce the number of variations to be handled. In the case where all the parts are from a common Distribution Library with the same Part Type and have the same packaging metadata, XML generator program 112 utilizes wildcards to reduce the size of the XML file for all like parts to a single line entry by using the "includes=*" syntax in the function.xml file.

In the case where all parts in a common Distribution Library with the same Part Type do not have the same packaging metadata, XML generator program 112 reduces the number of entries in the XML files to the number of unique combinations of Distribution Library, Part Type, and packaging metadata by using the "includes=parta, partb, . . . partn" parameter syntax in the XML file. This wildcarding process helps to filter out certain aspects of the input data based on a pre-set percentage basis, i.e., a percentage input by a user, e.g., 75%. XML generator program 112 can generate wildcards with exclude statements allowing for a decrease in the complexity and size of the XML file, while at the same time increasing the parsing efficiency of the XML as well as the readability. For example, if at least 75% of the parts of a particular Part Type can be wildcards, XML generator program 112 generates a wildcard with an excludes statement for the remaining 25%, and then separate entries as needed to profile the remaining 25% in an efficient manner.

In an embodiment, XML generator program 112 packages parts using PDSs matching the Distribution Libraries from the previous packaging tooling. There are several advantages to using the PDS s: (1) it eliminates the need to include allocation parameters for each part in the function.xml file; (2) it removes the need to map the long path/part.name in the file system to the shipped name of the part; and (3) it eases comparison of the parts built with the new process to those that were build using the prior process. XML generator program 112 uses the PDSs in conjunction with wildcarding to identify what members of the partitioned dataset to be processed by the specific XML directive, i.e., if a Distribution Library contains a wildcard, XML generator program 112 pulls or excludes (based on the wildcard) all the information pertaining to the wildcard without needing to verify specific strings. In an embodiment, XML generator program 112 computes Release Files (RELFILEs) and allocation parameters. At this point, XML generator program 112 knows how many RELFILEs are necessary and how many members it will contain. XML generator program 112 needs to compute allocation parameters suitable to create the RELFILEs with the proper space requirements. In other words, XML generator program 112 now knows the size and format of the product package being generated.

In step 230, XML generator program 112 enables the user to review the modified data. In an embodiment, XML generator program 112 enables a user through a user interface of a user computing device, e.g., user interface 122 of user computing device 120, to review the collected and modified data and adjust any values if necessary. Review of the generated part entries in the function.xml file and the supporting datasets often reveals additional opportunities for refinement of the XML files. In an embodiment in which XML generator program 112 receives an adjusted value from the user, XML generator program 112 accepted and adjusts the value accordingly. In an embodiment, XML generator program 112 enables the user to accept the data once the user has reviewed and provided any adjustments to the data.

In step 240, XML generator program 112 generates a set of XML files. In an embodiment, XML generator program 112 generates a set of XML files from the collected, modified, and reviewed data. In an embodiment, responsive to the user reviewing the data, XML generator program 112 generates the set of XML files. In an embodiment, XML generator program 112 generates four XML files (e.g., build.xml, function.xml, service.xml, and package.xml), four datasets of supporting information (e.g., ftpinfo.txt, mapping.txt, distlibs.txt, and details.txt), and one sample XML file (e.g., holds.xml). The four datasets of supporting information are for archival purposes and provide an easy way for a user to review the results and possibly identify opportunities for refinement.

In step 250, XML generator program 112 creates an immutable record of relevant data. In an embodiment, XML generator program 112 employs blockchain techniques as known to a person of skill in the art to create an immutable record of all relative data collected, modified, reviewed, and generated in steps 210-240. The relative information includes, but is not limited to, date, time, version, information, source of the data, details extracted, and manual overrides. In an embodiment, XML generator program 112 enables a second user to validate XML files by checking to see if the inputs to the XML files exist within the blockchain. The second user is able to validate that the XML files have not been tampered with and match the blockchain records.

In step 260, XML generator program 112 outputs the set of XML files. Once the XML files are generated, XML generator program 112 outputs the set of XML files. In an embodiment, XML generator program 112 outputs the four XML files (e.g., build.xml, function.xml, service.xml, and package.xml), four datasets of supporting information (e.g., ftpinfo.txt, mapping.txt, distlibs.txt, and details.txt), and one sample XML file to a user through a user interface of a user computing device.

Figure 3:
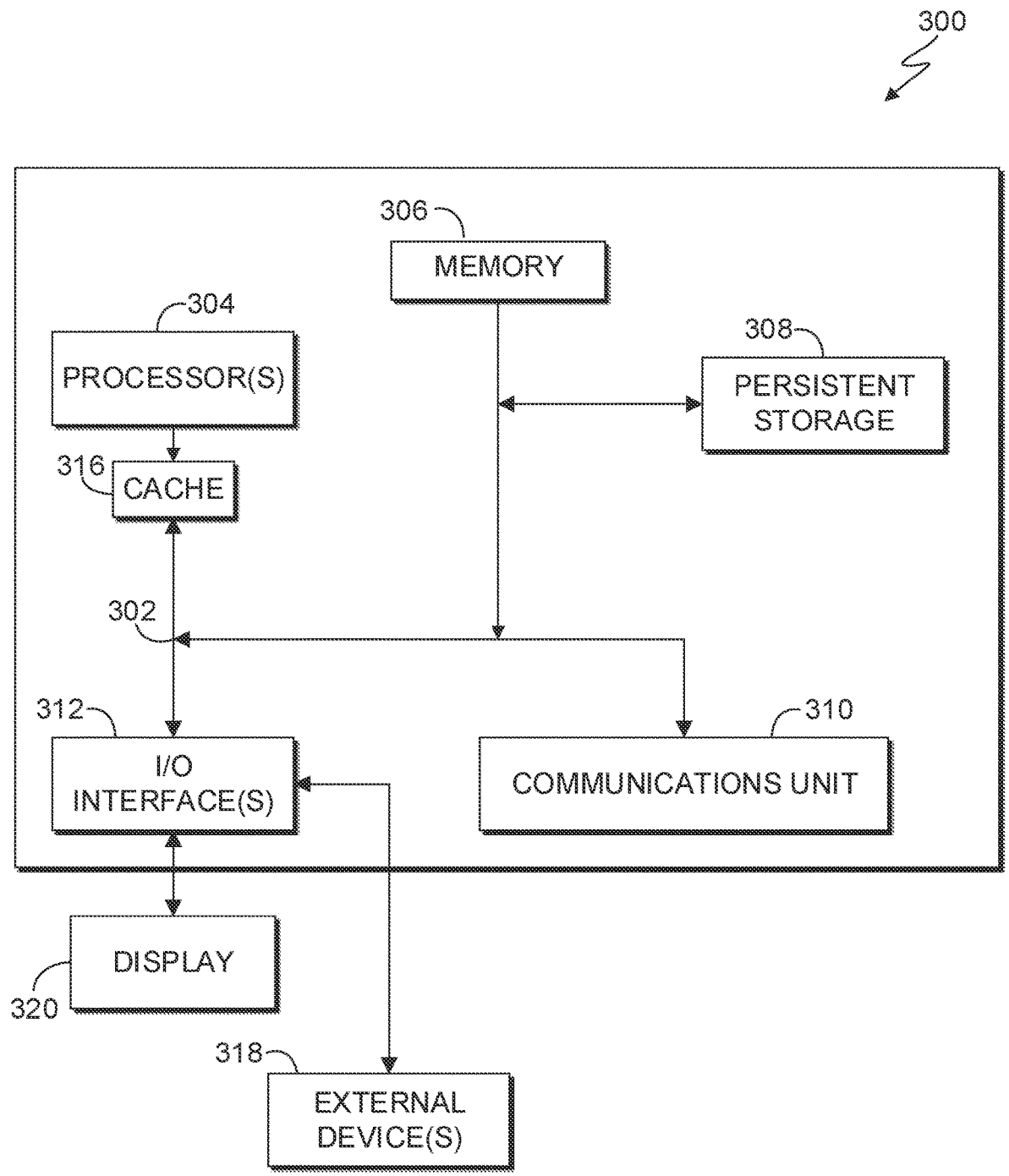
FIG. 3 depicts a block diagram of components of a computing device executing the XML generation program within the distributed data processing environment of FIG. 1, in accordance with an embodiment of the present invention.

FIG. 3 depicts a block diagram of components of computing device 300, suitable for server 110 and/or user computing device 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110 and/or user computing device 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating Extensible Markup Language (XML) files for packaging operations of software products, the computer-implemented method comprising:
   receiving, by one or more computer processors, from a user via a user interface, release and driver information pointing to a subset of data;
   collecting, by the one or more processors, the subset of data from existing sources based on the release and driver information;
   modifying, by the one or more processors, the subset of data using wildcarding to generate a modified subset of data that is smaller than the subset of data by:
      identifying, by the one or more processors, a list of shipped parts from the subset of data;
      grouping, by the one or more processors, shipped parts on the list of shipped parts by Distribution Library and part type; and
      creating, by the one or more processors, a single line entry for a grouping of shipped parts by using a wildcard character;
   generating, by the one or more processors, a set of four Extensible Markup Language (XML) files from the modified subset of data;
   creating, by the one or more processors, using blockchain, an immutable record of the subset of data, the modified subset of data, and the set of four XML files; and
   outputting, by the one or more processors, the set of four XML files.

2. The computer-implemented method of claim 1, further comprising:
   responsive to generating the modified subset of data, enabling, by the one or more processors, a user through a user interface to review the modified subset of data.

3. The computer-implemented method of claim 1, wherein the set of four XML files include a build XML file, a function XML file, a service XML file, and a package XML file.

4. The computer-implemented method of claim 3, further comprising:
   generating, by the one or more processors, a dataset of supporting information for each XML file of the set of four XML files.

5. The computer-implemented method of claim 1, further comprising:
   enabling, by the one or more processors, a user through a user interface to validate the set of four XML files based on the immutable record.

6. A computer program product for generating Extensible Markup Language (XML) files for packaging operations of software products, the computer program product comprising:

one or more computer readable storage media and program instructions collectively stored on the one or more computer readable storage media, the stored program instructions comprising:
program instructions to receive from a user via a user interface, release and driver information pointing to a subset of data;
program instructions to collect the subset of data from existing sources based on the release and driver information;
program instructions to modify the subset of data using wildcarding to generate a modified subset of data that is smaller than the subset of data by:
 identifying a list of shipped parts from the subset of data;
 grouping shipped parts on the list of shipped parts by Distribution Library and part type; and
 creating a single line entry for a grouping of shipped parts by using a wildcard character;
program instructions to generate a set of four Extensible Markup Language (XML) files from the modified subset of data;
program instructions to create, using blockchain, an immutable record of the subset of data, the modified subset of data, and the set of four XML files; and
program instructions to output the set of four XML files.

7. The computer program product of claim 6, further comprising:
responsive to generating the modified subset of data, program instructions to enable a user through a user interface to review the modified subset of data.

8. The computer program product of claim 6, wherein the set of four XML files include a build XML file, a function XML file, a service XML file, and a package XML file.

9. The computer program product of claim 8, further comprising:
program instructions to generate a dataset of supporting information for each XML file of the set of four XML files.

10. The computer program product of claim 6, further comprising:
program instructions to enable a user through a user interface to validate the set of four XML files based on the immutable record.

11. A computer system for generating Extensible Markup Language (XML) files for packaging operations of software products, the computer system comprising:
one or more computer processors;
one or more computer readable storage media;
program instructions collectively stored on the one or more computer readable storage media for execution by at least one of the one or more computer processors, the stored program instructions comprising:
program instructions to receive from a user via a user interface, release and driver information pointing to a subset of data;
program instructions to collect the subset of data from existing sources based on the release and driver information;
program instructions to modify the subset of data using wildcarding to generate a modified subset of data that is smaller than the subset of data by:
 identifying a list of shipped parts from the subset of data;
 grouping shipped parts on the list of shipped parts by Distribution Library and part type; and
 creating a single line entry for a grouping of shipped parts by using a wildcard character;
program instructions to generate a set of four Extensible Markup Language (XML) files from the modified subset of data;
program instructions to create, using blockchain, an immutable record of the subset of data, the modified subset of data, and the set of four XML files; and
program instructions to output the set of four XML files.

12. The computer system of claim 11, further comprising:
responsive to generating the modified subset of data, program instructions to enable a user through a user interface to review the modified subset of data.

13. The computer system of claim 11, wherein the set of four XML files include a build XML file, a function XML file, a service XML file, and a package XML file.

14. The computer system of claim 11, further comprising:
program instructions to enable a user through a user interface to validate the set of four XML files based on the immutable record.

* * * * *